May 6, 1947.  S. J. GORAN  2,419,992
COLLECTOR RING
Filed Oct. 18, 1943  2 Sheets-Sheet 1
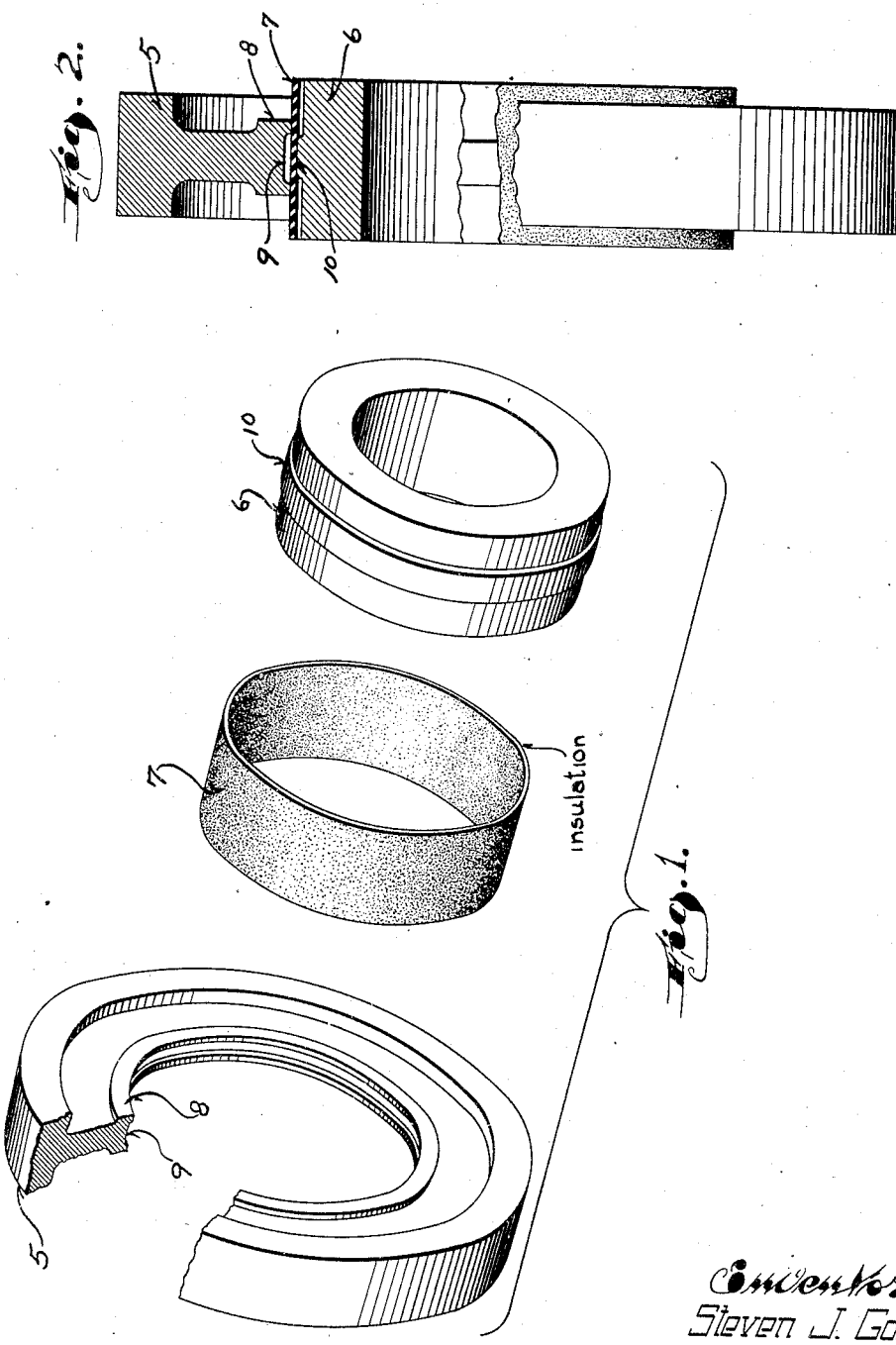
Inventor
Steven J. Goran

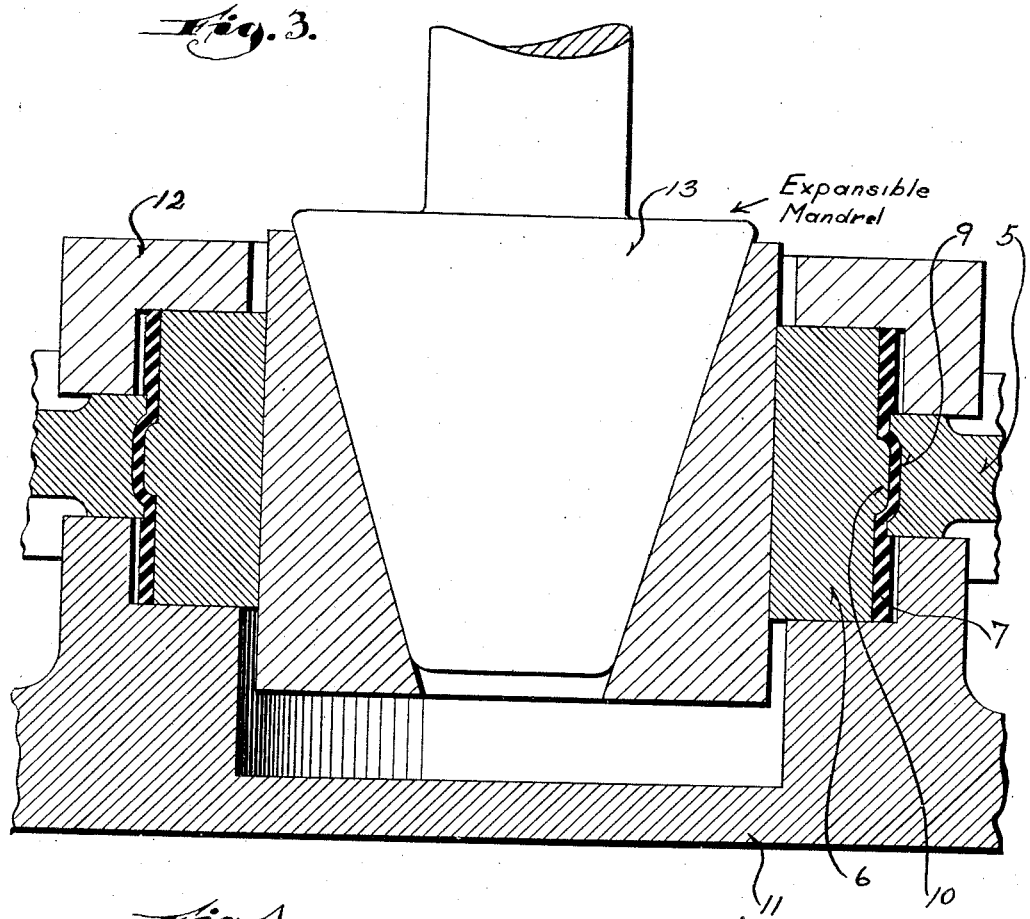
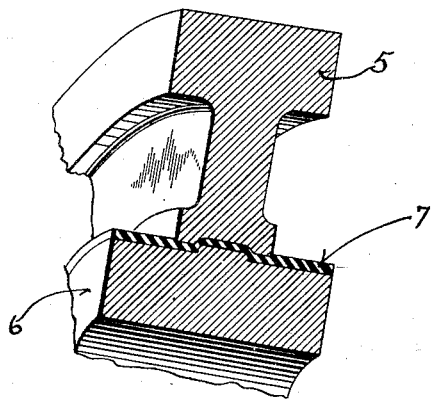

Patented May 6, 1947

2,419,992

UNITED STATES PATENT OFFICE 2,419,992

COLLECTOR RING

Steven J. Goran, Milwaukee, Wis., assignor to The Louis Allis Company, Milwaukee, Wis., a corporation of Wisconsin Application October 18, 1943, Serial No. 506,757

2 Claims. (Cl. 171—322)

This invention relates broadly to any structure wherein concentric annular metal parts must be securely, mechanically joined but electrically insulated from each other, and refers specifically to collector rings for dynamo-electric machines.

In the making of collector rings, the practice, heretofore, has been to assemble a hub or bushing with a ring member with a mica bushing or sleeve interposed therebetween. The hub was provided with an internal annular groove so dimensioned that upon endwise compression of the hub an outward annular protrusion or bead was formed on the bushing. This protrusion or bead forced the mica insulation into a complementary groove in the bore of the ring member and thereby locked the ring member onto the hub.

This past construction had several serious disadvantages. It was never possible to produce uniformly secure joints as the extent and manner in which the bushing bulged out in consequence to endwise compression was entirely unpredictable.

The result varied with many factors. For instance, the exact shape of the bottom of the groove had a very material affect upon the cross sectional shape of the resulting bead, as did also the depth of the groove. Examination of collector rings made with the past method disclosed that the bead pushed out by the endwise compression of the hub would often assume a sharp triangular shape which fractured and sometimes entirely ruptured the mica spacer and thus resulted in grounding of the ring.

Moreover, in order to enable assembly of the parts, working clearance had to be left and this clearance was never taken up during the formation of the annular bulge or bead except at the relatively small area of the bulge itself.

With these and other objections to past methods of mounting collector rings on their bushings in view, this invention has as its object the provision of an entirely new and improved manner of assembling a collector ring or the like on a bushing by which the ring and bushing with the dielectric spacer therebetween become substantially one integral unit with all of the clearance necessary for assembly completely taken up and with the dielectric spacer continuous and unbroken between the parts.

Another object of this invention is to provide an electrically insulated joint between two annular metal parts which is secure against loosening and wherein an interlocking tongue and groove of substantial area confines the dielectric spacer without danger of fracture.

Another object of this invention is to provide a joint of the character described which is not affected by heat developed in the parts during use.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a perspective view of the several parts of a collector ring with which this invention is concerned, shown separated preparatory to being assembled;

Figure 2 is an end view with parts broken away and in section showing the parts of Figure 1 in sub-assembly;

Figure 3 is a view illustrating the manner in which the bushing or inner annular member is expanded to affect the juncture of the parts; and Figure 4 is a fragmentary perspective sectional view through the joint illustrating the same in its finished condition.

Referring now particularly to the accompanying drawings, in which like numerals refer to like parts, the numeral 5 designates a collector ring of the type used in dynamoelectric machines and which must be mounted on a hub or bushing 6, but electrically insulated therefrom.

While the drawings illustrate a specific application of the invention, namely, the collector ring of a dynamoelectric machine, it is to be appreciated that the invention is not limited to this specific use, but resides broadly in the provision of an electrically insulated joint between two annular metal members, one within the other.

The dielectric between the parts is provided by a sleeve 7 of mica, or other suitable material, and a binder of shellac or the like.

The bore 8 of the ring or outer annular member has a shallow groove 9 while the hub or bushing 6 has a correspondingly shaped ridge or bead 10.

The diameters of the bore 8 and the bead or ridge 10 are such that the parts may be assembled with the insulating sleeve 7 therebetween, as shown in Figure 2.

With the parts thus arranged in subassembly they are placed in a press jig 11 which includes a ring 12. The jig 11 in connection with the ring 12 supports the sub-assembly horizontally with the parts thereof in proper relative positions. To this end the jig and the ring 12 are counterbored to accommodate the hub or bushing and the insulating sleeve.

With the parts thus held, an expansible mandrel 13 is inserted into the hub or bushing and its tapered plunger forced down to expand the hub and in fact the entire assembly radially.

Before the sub-assembly is placed in the jig 11 it is heated to a temperature of approximately 200°. This facilitates the radial expansion of the parts, but what is more important, it softens the shellac or other binder of the mica or equivalent dielectric sleeve so that during its compression resulting from the radial expansion of the parts, the shellac or binder is squeezed out. This is important as it conditions the dielectric sleeve to insure against its being deleteriously affected by heat during use of the machine in which the assembly is embodied.

As noted hereinbefore, not only is the hub expanded but also the ring or outer annular part. Hence, the entire assembly is expanded radially to become one integral unit. This assures the tightness of the juncture and enables the attainment of uniform results.

From the foregoing description, taken in connection with the accompanying drawings, it will be readily apparent to those skilled in the art that this invention entirely eliminates the disadvantages of the past methods of making collector rings in that it secures an absolutely tight joint in which the bond is between surfaces of substantial area as distinguished from the more or less edgelike contact of the past; precludes fracturing of the dielectric and thereby affords assurance against the development of ground connections during use; and conditions the dielectric against being affected by subsequent heating of the joint resulting from heating of the machine in which the collector ring is embodied.

It will also be apparent that while the drawings show the use of an expansible mandrel for expanding the hub, an ordinary tapered plug of the proper size may be driven through the bore of the hub to accomplish the same result.

What I claim as my invention is:

1. A collector ring of the character described, comprising: solid inner and outer ring shaped members in telescoping relationship; a sleeve of dielectric material separating the adjacent peripheries of said telescoped members; and an annular bead on the periphery of one of said members aligning with a complementary annular groove on the adjacent periphery of the other of said members, the inner ring shaped member being expanded radially outwardly toward the inner periphery of the outer ring shaped member with said dielectric sleeve compressed between the adjacent peripheries of the members and with said bead holding a portion of the dielectric sleeve within its complementary annular groove to thereby hold the ring shaped members interlocked as a single unit.

2. In combination with inner and outer solid ring shaped members telescoped together with the inner periphery of the outer member directly adjacent to the outer periphery of the inner member, a sleeve of electrical insulating material interposed between said peripheries of the members, an annular bead on the periphery of the inner member substantially medially thereof aligning with a complementary annular groove on the inner periphery of the outer member and said inner ring shaped member being expanded radially outwardly with the insulating sleeve compressed between the peripheries of the members and with a portion of said sleeve overlying the annular bead deformed out of the cylindrical bounding surface of the sleeve and projected into the groove of the outer member by the bead on the inner member to thereby hold the telescoping members interlocked as a single unit and electrically insulated one from the other.

STEVEN J. GORAN.

REFERENCES CITED

The following references are of record in the file of this patent:

UNITED STATES PATENTS

| Number | Name | Date |
|---|---|---|
| 1,108,940 | Starker | Sept. 1, 1914 |
| 1,378,564 | Schou | May 17, 1921 |
| 1,393,564 | Mills | Oct. 11, 1921 |
| 2,109,992 | French | Mar. 1, 1938 |
| 680,265 | Moody | Aug. 13, 1901 |
| 2,122,839 | Guy | July 5, 1938 |
| 523,019 | Thomson | July 17, 1894 |

FOREIGN PATENTS

| Number | Country | Date |
|---|---|---|
| 137,320 | British | July 2, 1920 |